US012760568B2

(12) United States Patent
Dixey et al.

(10) Patent No.: US 12,760,568 B2
(45) Date of Patent: Oct. 13, 2026

(54) LOCKING APPARATUS, SYSTEM AND METHODS FOR SECURING AN ENTRYWAY

(71) Applicant: Verizon Patent and Licensing Inc., Basking Ridge, NJ (US)

(72) Inventors: Michael W Dixey, Roseville, CA (US); Vikramjeet Singh, Irvine, TX (US); James M Cigler, Rancho Cordova, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 18/959,749

(22) Filed: Nov. 26, 2024

(65) Prior Publication Data

US 2026/0146485 A1 May 28, 2026

(51) Int. Cl.
*E05C 19/08* (2006.01)
*E05B 67/36* (2006.01)

(52) U.S. Cl.
CPC .............. *E05C 19/08* (2013.01); *E05B 67/36* (2013.01)

(58) Field of Classification Search
CPC .......... E05B 67/36; E05B 67/22; E05B 67/38; E05B 67/383; E05B 65/48; E05C 19/08; Y10T 292/31
USPC .................................................. 70/2, 7, 8, 4
See application file for complete search history.

(56) References Cited

U.S. PATENT DOCUMENTS 1,027,878 A * 5/1912 Milewski ................ E05B 83/02 292/284
1,173,112 A * 2/1916 Knight .................... E05B 65/48 70/9
1,627,752 A * 5/1927 Small ...................... E05C 3/044 292/228
1,777,085 A * 9/1930 Heil ........................ E05C 19/08 292/285
1,835,123 A * 12/1931 Tobin ...................... E05C 19/08 292/284
2,461,708 A * 2/1949 Thein ...................... E05G 1/024 292/281
3,392,555 A * 7/1968 Beaver .................... E05B 67/38 70/56
3,759,557 A * 9/1973 Athas .................... E05B 67/383 292/281
3,830,085 A * 8/1974 Gerlach .................. E05B 67/36 70/35

(Continued)

FOREIGN PATENT DOCUMENTS

CN 103998703 A * 8/2014 ............. E05B 65/48
CN 205000776 U * 1/2016 ............. E05B 67/38

(Continued)

*Primary Examiner* — Steven A Tullia

(57) ABSTRACT

A high security hasp is provided including a ribbed hasp plate configured to be affixed to an entryway door. The ribbed hasp plate includes a multiplanar lock guard. The high security hasp may also include a hasp pocket member configured to be affixed to an enclosure wall proximate the entryway door. The hasp pocket member may include a base member comprising a hasp plate having a staple proximate the entryway door, and a chamber member that is permanently affixed to the base member, that has an end proximate the entryway door that is configured to provide a lock guard, and that may be filled with one or more of concrete, stone, metal, metal alloy, glass, sand, or polymeric material.

20 Claims, 7 Drawing Sheets

(56) References Cited

U.S. PATENT DOCUMENTS

| | | | | |
|---|---|---|---|---|
| 3,899,907 | A * | 8/1975 | Prahl | E05B 9/084 70/451 |
| 3,996,774 | A * | 12/1976 | Best | E05B 67/36 70/32 |
| 4,033,155 | A * | 7/1977 | De Lucia | E05B 67/38 292/281 |
| 4,033,156 | A * | 7/1977 | Cottingham | E05B 17/002 174/67 |
| 4,322,102 | A * | 3/1982 | Lindblom | E05C 19/08 292/281 |
| 4,380,160 | A * | 4/1983 | Hoffman | B60D 1/60 70/56 |
| 4,535,612 | A * | 8/1985 | Seremet | E05B 67/38 70/56 |
| 4,688,409 | A * | 8/1987 | Oliver | E05B 15/1614 70/451 |
| 4,754,626 | A * | 7/1988 | Siegel | E05B 67/36 70/32 |
| 4,793,163 | A * | 12/1988 | MacFarlane | E05C 19/08 292/281 |
| 4,852,920 | A * | 8/1989 | DeForrest, Sr. | E05B 67/38 292/281 |
| 4,879,889 | A * | 11/1989 | DeForrest, Sr. | E05B 67/38 292/281 |
| 5,076,531 | A * | 12/1991 | Delaney | E05B 67/383 292/281 |
| 5,469,722 | A * | 11/1995 | Ellefsen | E05B 67/38 70/2 |
| 5,479,802 | A * | 1/1996 | Miller | E05B 15/1614 408/241 B |
| 5,934,111 | A * | 8/1999 | Hernandez | E05C 19/08 292/281 |
| 5,941,102 | A * | 8/1999 | Reinholdsson | E05C 19/184 70/52 |
| 6,708,532 | B2 * | 3/2004 | Winland | E05B 83/10 70/2 |
| 6,766,671 | B2 * | 7/2004 | Haczynski | E05B 67/383 70/56 |
| 6,915,670 | B2 * | 7/2005 | Gogel | E05B 67/38 70/32 |
| 7,581,420 | B2 * | 9/2009 | Manthe | F16K 35/10 70/180 |
| 7,694,541 | B2 * | 4/2010 | Shum | E05B 37/10 70/52 |
| 7,870,767 | B2 * | 1/2011 | Brojanac | E05B 67/383 70/180 |
| 8,220,296 | B2 * | 7/2012 | Boonstra | E05C 19/08 70/2 |
| 8,266,932 | B2 * | 9/2012 | Longwell | E05C 19/08 70/2 |
| 9,184,573 | B1 * | 11/2015 | Jonas | H02G 1/00 |
| 11,274,472 | B2 * | 3/2022 | Lasquete | E05C 19/08 |
| 11,352,810 | B2 * | 6/2022 | Kagan | E06B 3/70 |
| 11,814,878 | B2 * | 11/2023 | Lee, II | E05B 67/36 |
| 12,139,939 | B2 * | 11/2024 | Lasquete | E05B 67/383 |
| 2005/0016229 | A1 * | 1/2005 | Evans | E05B 65/48 70/9 |
| 2008/0141745 | A1 * | 6/2008 | Rohde | E05B 17/18 70/455 |
| 2009/0031763 | A1 * | 2/2009 | Nielsen | E05B 67/36 70/2 |
| 2009/0107190 | A1 * | 4/2009 | Nielsen | E05B 83/10 70/158 |
| 2009/0108591 | A1 * | 4/2009 | De Vries | E05B 15/0245 292/64 |
| 2012/0011682 | A1 * | 1/2012 | Boonstra | E05C 19/08 16/384 |
| 2015/0197963 | A1 * | 7/2015 | Chen | E05B 37/025 70/14 |
| 2024/0381547 | A1 * | 11/2024 | Fermin | H05K 5/0208 |

FOREIGN PATENT DOCUMENTS

| | | | | |
|---|---|---|---|---|
| CN | 205100697 | U * | 3/2016 | E05B 67/38 |
| CN | 112443208 | A * | 3/2021 | E05B 67/28 |
| DK | 200600389 | A * | 6/2006 | E05B 13/002 |
| ES | 2974192 | T3 * | 6/2024 | E05B 67/383 |
| FR | 3048013 | A1 * | 8/2017 | E05B 9/08 |
| GB | 227884 | A * | 1/1925 | E05B 67/38 |
| GB | 2367091 | A * | 3/2002 | E05B 67/383 |
| NL | 8500037 | A * | 8/1986 | E05B 67/38 |
| SE | 1450443 | A1 * | 10/2015 | E05C 19/18 |
| WO | WO-2012054839 | A1 * | 4/2012 | E05B 67/383 |

* cited by examiner

LOCKING APPARATUS, SYSTEM AND METHODS FOR SECURING AN ENTRYWAY

BACKGROUND

Existing padlock hasps installed on entryway doors, such as those installed on cellular equipment enclosures, may be bypassed by mechanical methods such as with grinders and other cutting instruments. As such, the occurrence of break-ins is on the rise. Thus, there is a need for a stronger hasp that is more resistant to mechanical attacks, such as cutting instrument attacks.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

Although various exemplary embodiments are described with respect to a cellular equipment enclosures and/or entryways, it is contemplated that these embodiments have applicability to any opening or entryway capable of being secured by a locking hasp.

Figure 1A:
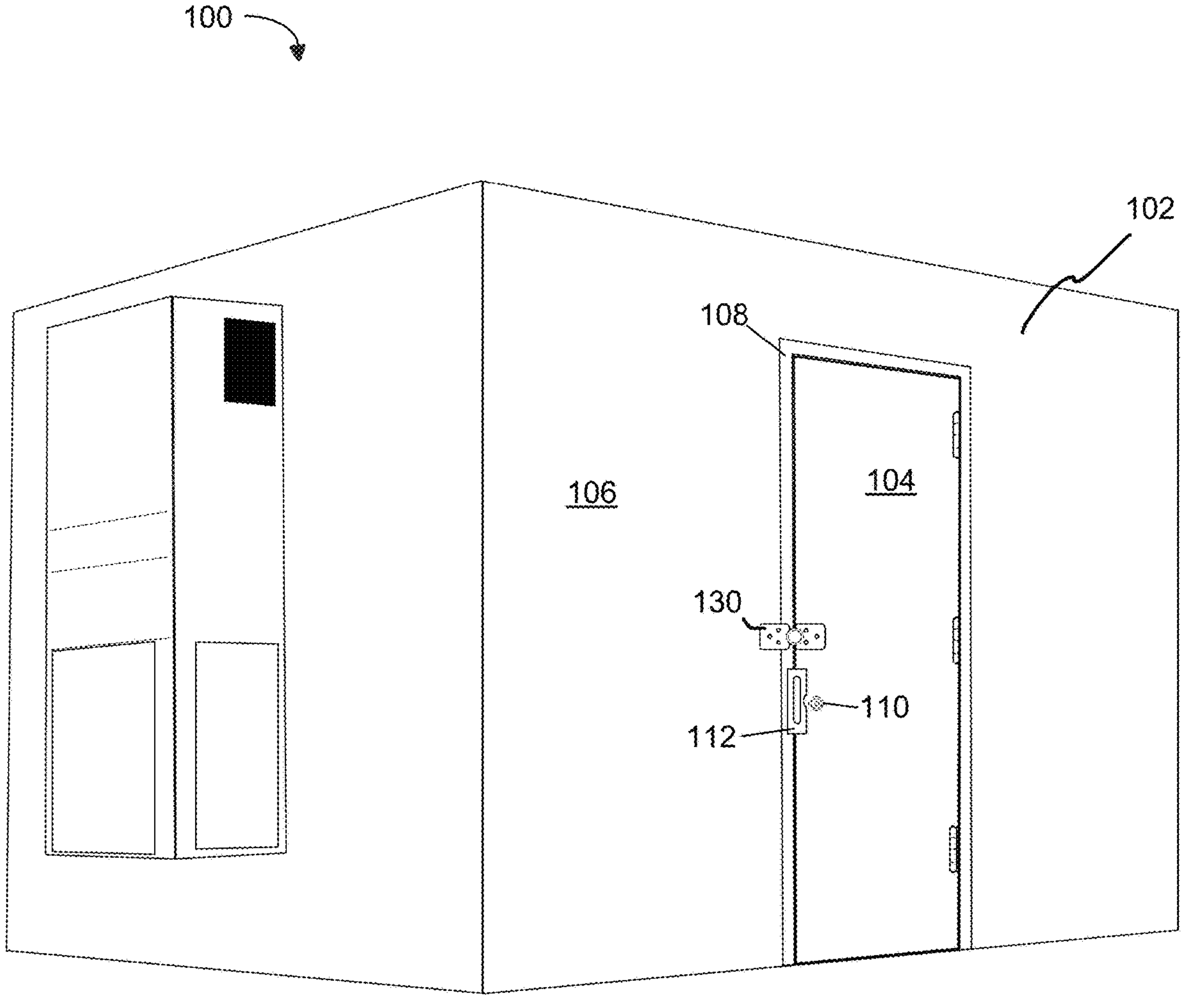
FIG. 1A is a perspective view of an exemplary enclosure.
Figure 1B:
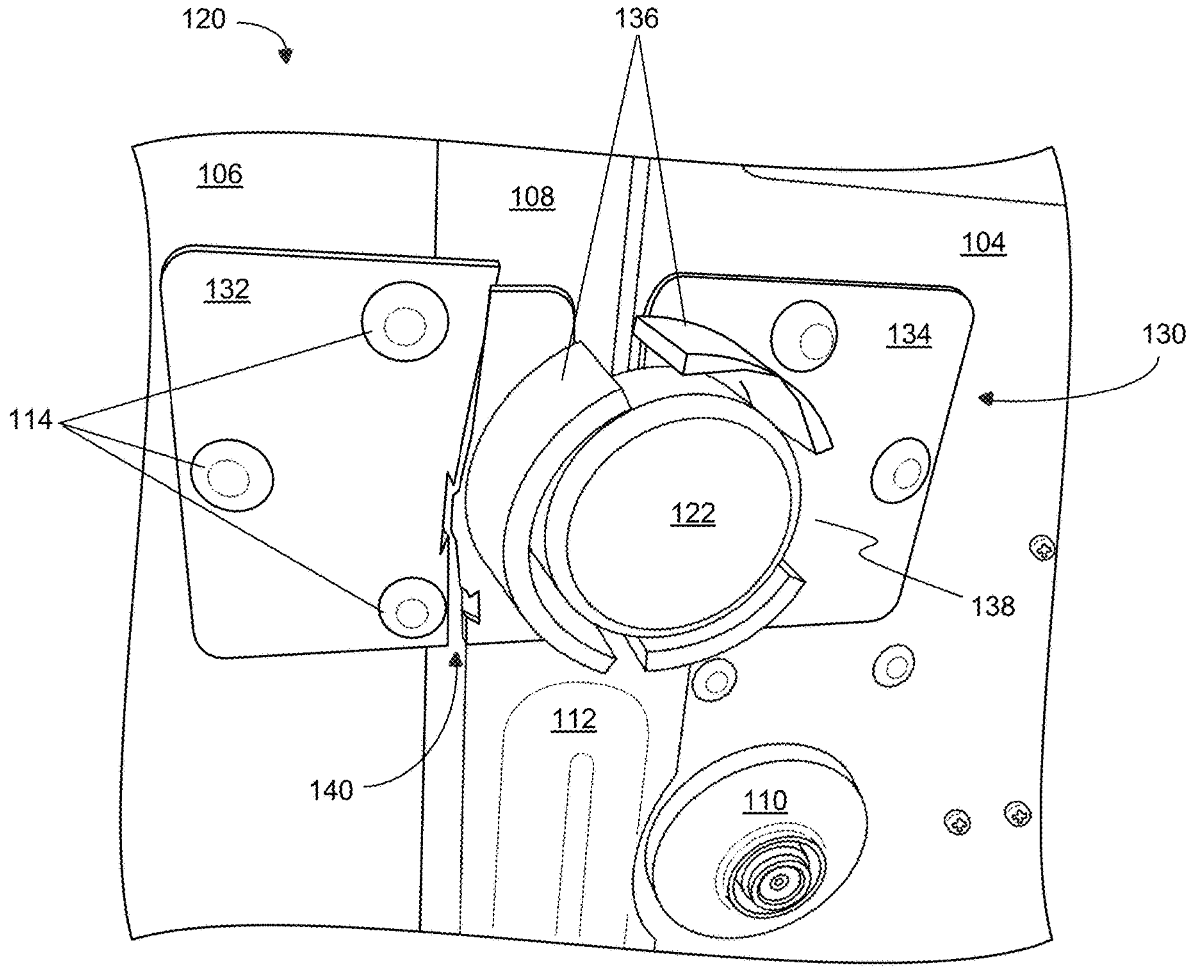
FIG. 1B is a perspective view of an exemplary conventional locking system.

Referring to the drawings, FIG. 1A shows a perspective view of an exemplary enclosure 100, such as a cellular equipment enclosure, while FIG. 1B shows a magnified portion thereof. Enclosure 100 may include a secured entryway 102, such as may be used in generally any walled room or enclosure, comprising a hinged door 104, a wall 106, and a door frame 108 therebetween. As shown and described herein for context, secured entryway 102 may also include a secured door handle/handle base 110 and a door latch cover plate 112.

Referring to FIG. 1B, a conventional locking system 120 is shown, comprising a cylindrical (puck) padlock 122 and conventional security hasp 130. In general, a security hasp may comprise one or more hasp plates, such as hasp plates 132 and 134. Hasp plates 132, 134 may be affixed to wall 106, frame 108, and/or door 104, respectively, in generally any suitable manner. For example, hasp plates 132, 134 may be affixed by one or more bolts 114, whose boltheads (shown in FIG. 1B) are located at proximal ends of threaded shafts (not shown) that extend longitudinally through throughholes (not shown) in wall 106 and door 104, and by washers and nuts (not shown) threaded around each threaded shaft near its distal end. As may be seen, hasp plate 132 is affixed to wall 106 and/or frame 108 and is therefore stationary. Similarly, hasp plate 134 is affixed to door 104 and is therefore nonstationary.

Referring still to FIG. 1B, conventional locking system 120 may comprise one or more lock guards 136. Conventionally, as shown, lock guards 136 comprise one or more rib or flange elements that extend outwardly normal to the plane of hasp plates 132, 134, that are integral to hasp plates 132, 134, and that are located proximate cylindrical padlock 122 and form a generally cylindrical shape such that they obstruct physical access to cylindrical lock 122. As shown, lock guards 136 are configured to form a cylindrical shape that follows approximately the outer contour of cylindrical padlock 122, and includes one or more gaps, such as gap 138. As may be seen, gap 138 is positioned proximate cylindrical lock 122 in a manner that permits physical access to a key cylinder (not shown) of the lock. As may be seen in FIG. 1B, conventional locking system 120 is vulnerable to one or more mechanical disruptions, such as one or more hasp cuts made by a cutting tool (e.g., a grinder), as illustrated by exemplary hasp cut 140. As may be appreciated, such mechanical disruptions may result in unauthorized bypass of cylindrical lock 122 and entryway break-ins.

Figure 2A:
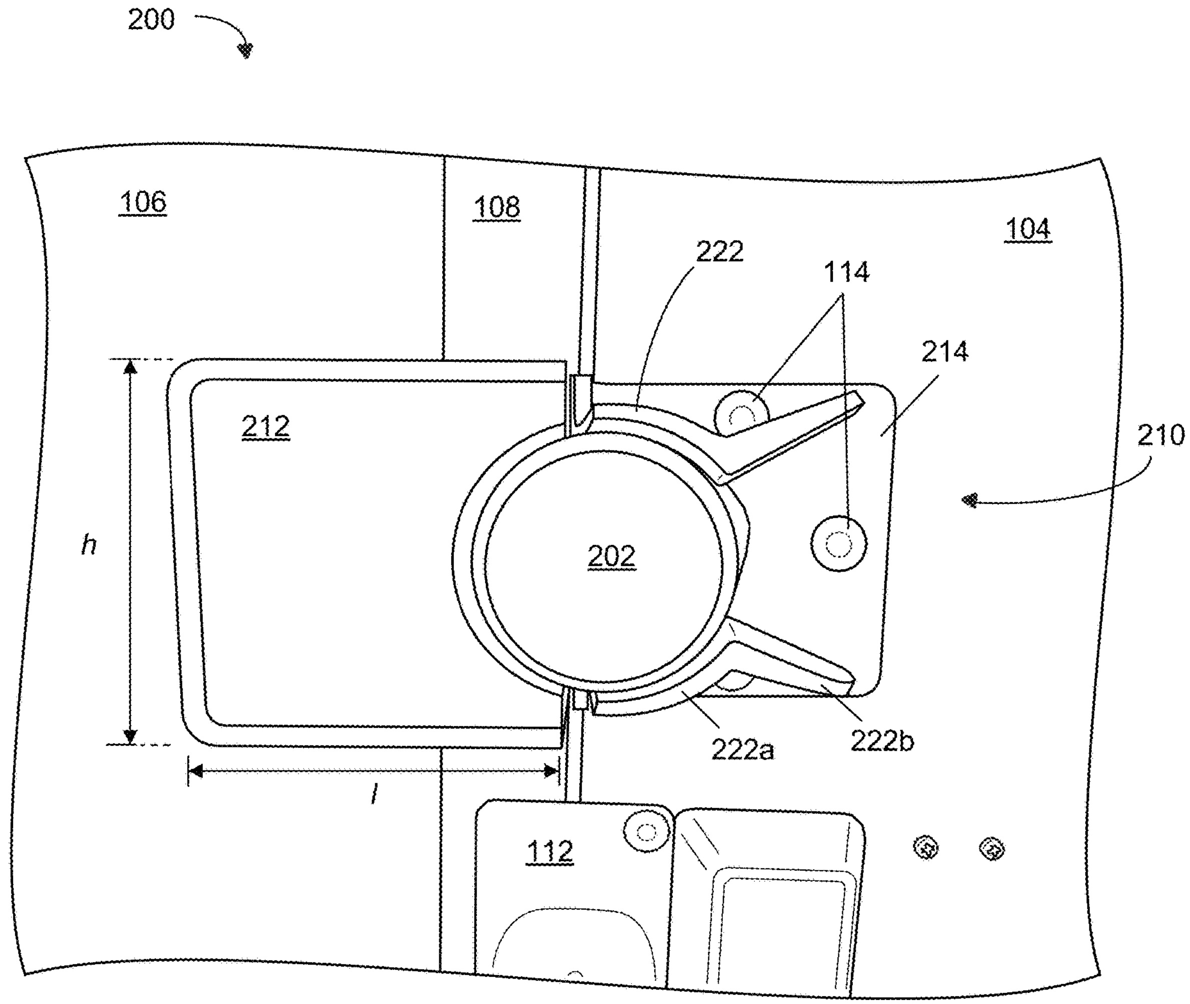
FIG. 2A is an elevational view of a locking system of the present disclosure, accordingly to an exemplary embodiment.
Figure 2B:
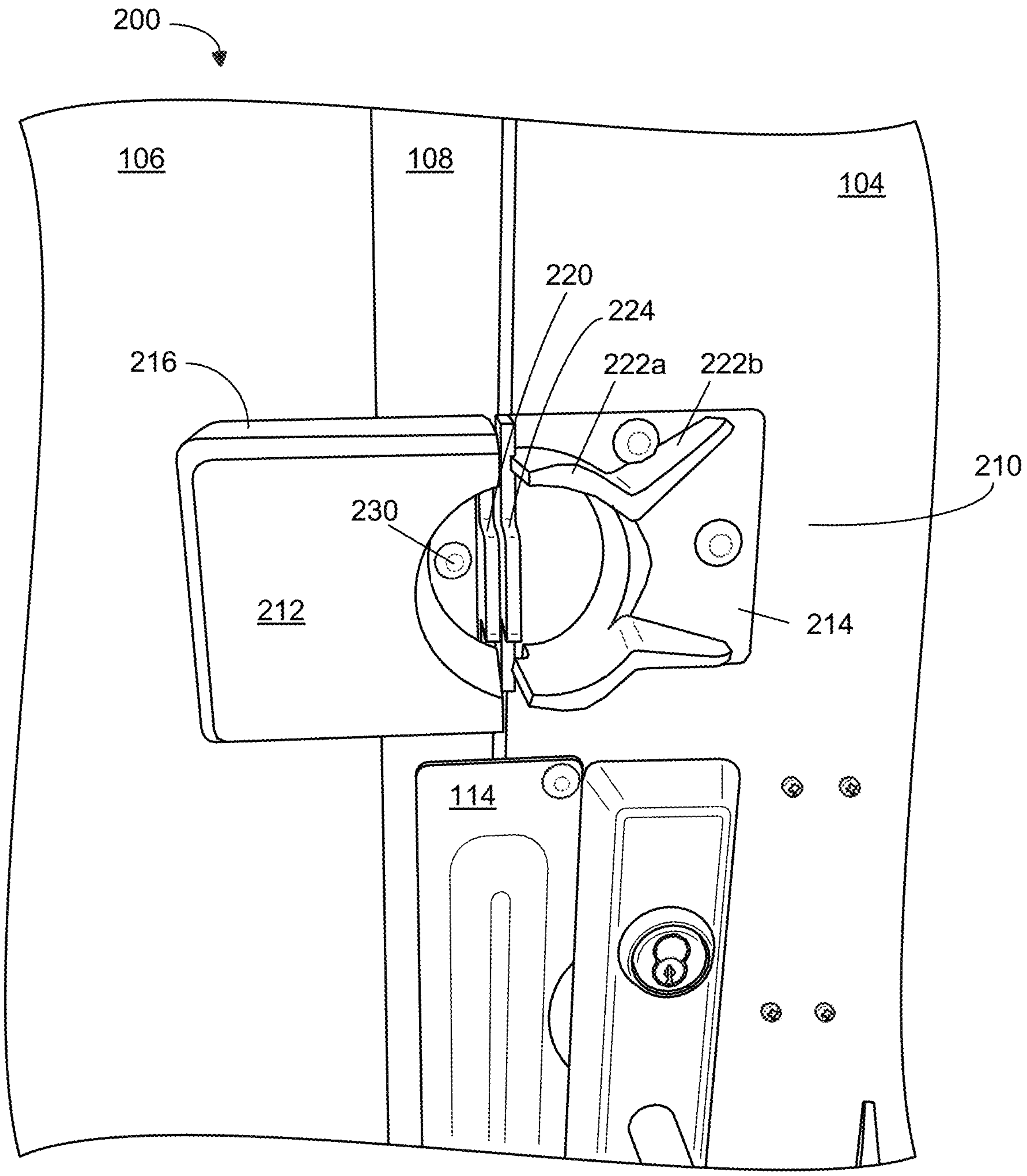
FIG. 2B is a perspective view of a locking system of the present disclosure, accordingly to an exemplary embodiment.

FIG. 2A illustrates an elevational view, and FIG. 2B a perspective view, of one embodiment of a high security locking system disclosed herein affixed to an entryway, and that overcomes shortcomings in conventional locking systems. As shown, locking system 200 may comprise a padlock 202 and a high security hasp 210. Padlock 202 may comprise generally any high security padlock of any suitable configuration, and in some embodiments may comprise a cylindrical (puck) type padlock, as shown in FIG. 2A. In general, high security hasp 210 may comprise one or more high security hasp members including a hasp pocket member (e.g., hasp pocket member 212) and/or a ribbed hasp plate (e.g., ribbed hasp plate 214).

Figure 3A:
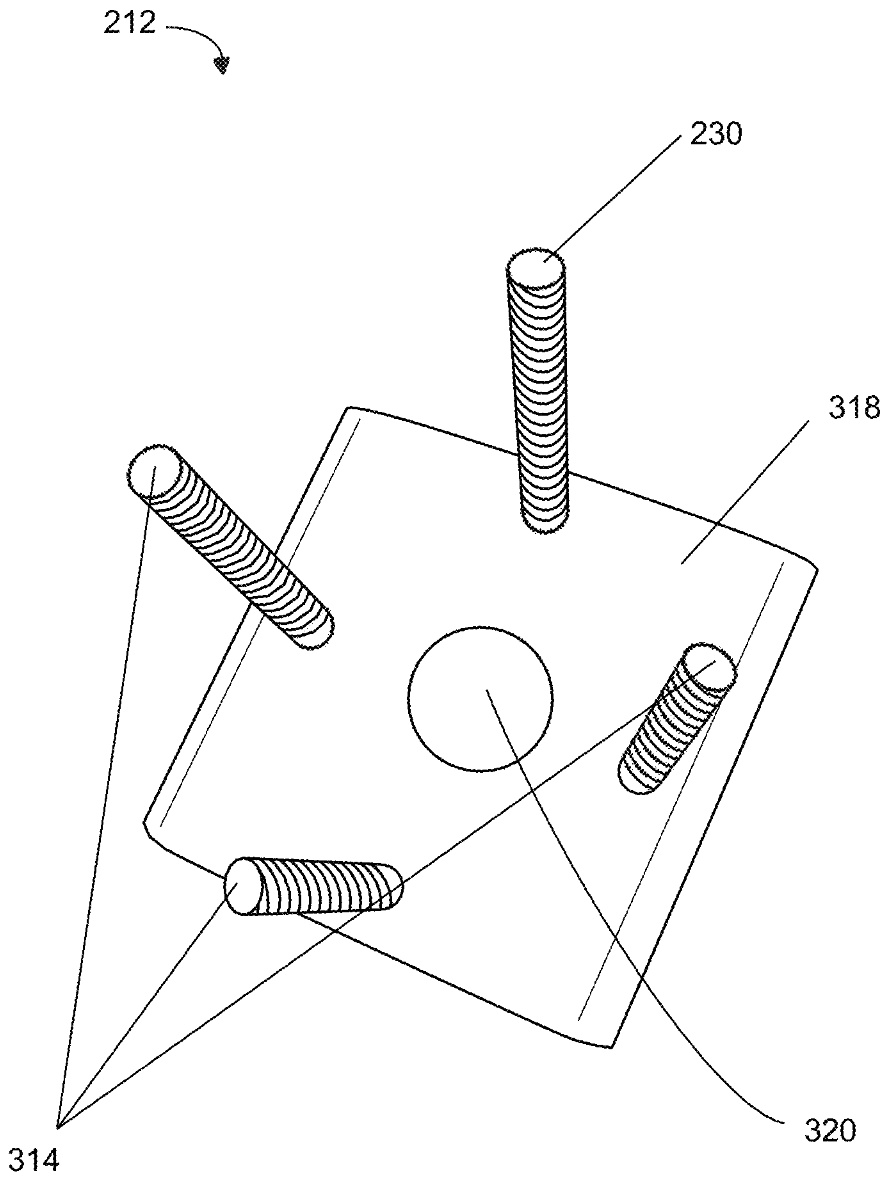
FIG. 3A is a rear perspective view of hasp pocket member of the present disclosure, according to an exemplary embodiment.
Figure 3B:
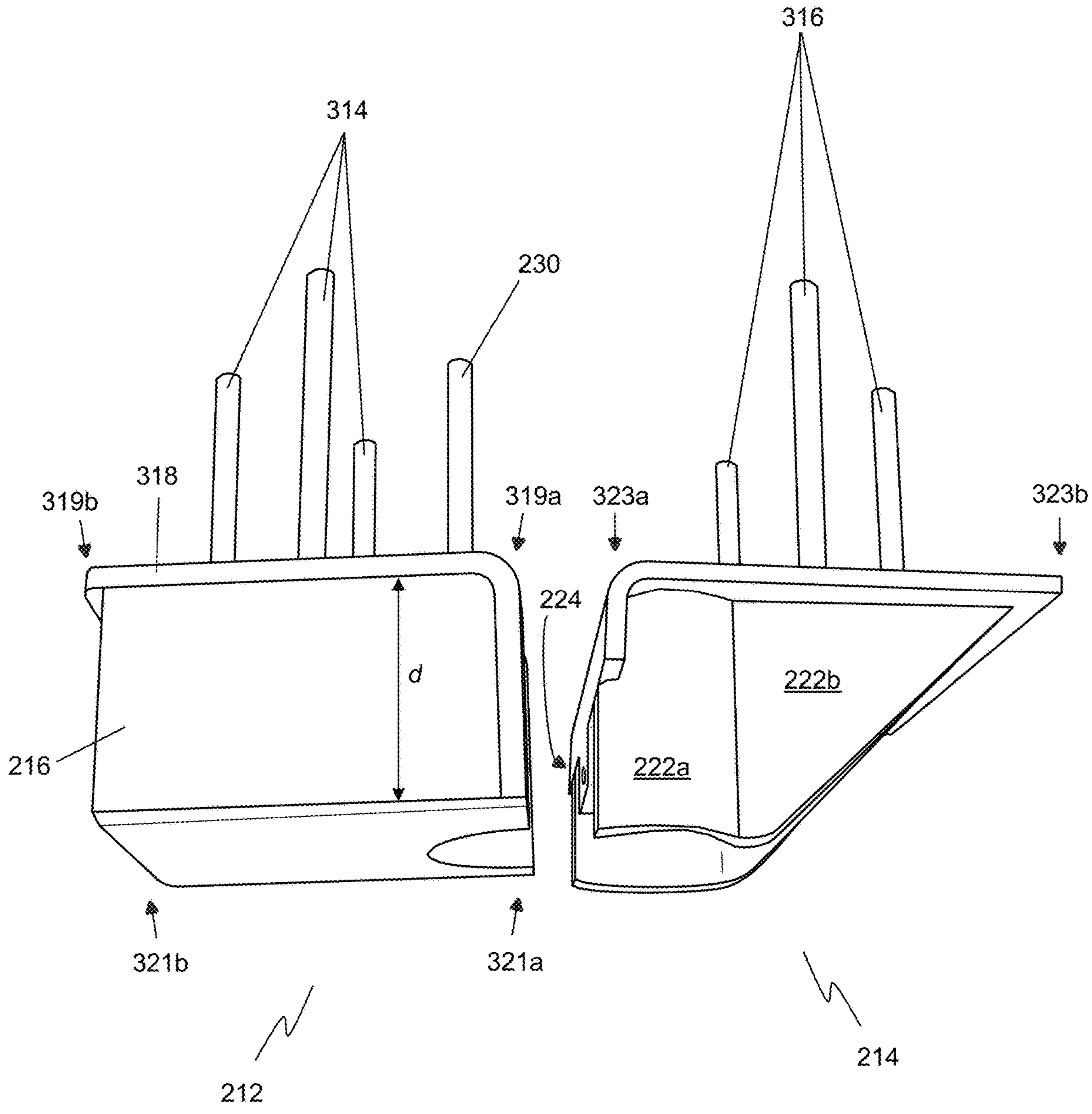
FIG. 3B is a top perspective view of hasp pocket member and ribbed hasp plate of the present disclosure, according to an exemplary embodiment.

Reference is now additionally made to FIG. 3A, a rear perspective view of hasp pocket member 212, and to FIG. 3B, a top perspective view of hasp pocket member 212 and ribbed hasp plate 214. In general, hasp pocket member 212 may comprise a chambered element configured to serve as both a hasp plate and a receptacle for tamper-resistant material, such as concrete, stone, sand, metal, reinforced polymers, alloys, etc. For example, as shown in FIGS. 2B, 3A, and 3B, hasp pocket member 212 may comprise a base member 318 having an outer surface (shown in FIG. 3A) and an inner surface (not shown) opposite the outer surface, and a chamber member 216. Base member 318 may comprise a hasp plate having a first end 319*a* and a second end 319*b* that is distal from the first end along a horizontal longitudinal axis. Base member 318 includes a staple proximate the first end, such as staple 220 shown in FIG. 2B. As may be appreciated, staples such as staple 220 may receive a padlock shackle. Chamber member 216 may comprise a box, or any similar receptacle that, when affixed to the inner surface of base member 318, forms a closed or semi-closed chamber (not show) that abuts or is proximal to base member 318. Chamber member 216 has a near end 321*a* and a far end 321*b* that is distal from near end 321*a* along a horizontal longitudinal axis.

With continued reference to FIGS. 2B, 3A, and 3B, in general, a hasp pocket member of the embodiments disclosed herein may be dimensioned in any manner sufficient to provide a hasp that has improved resistance to mechanical attacks, such as cutting instrument attacks. In some embodiments, such as that illustrated in FIGS. 2A-3B, a hasp pocket member may be provided that has a generally 3-dimensional rectangular (cuboid) or square (cubic) geometry. In some embodiments, the hasp pocket member may have a length, l, that is between about 3 inches and about 10 inches; in some embodiments, between about 3 inches and about 7 inches; in some embodiments, between about 3.5 inches and about 5.5 inches. In some embodiments, the hasp pocket member may have height, h, between about 3 inches and about 7 inches; in some embodiments, between about 3 inches and about 6 inches; in some embodiments, between about 3.5 inches and about 5.5 inches. In some embodiments, the hasp pocket member may have depth, d, between about 1 inch and about 5 inches; in some embodiments, between about 1.5 inches and about 4 inches; in some embodiments, between about 2 inches and about 3 inches.

Hasp pocket members of the embodiments herein may be pre-fabricated or retrofitted. As may be seen in FIGS. 2B, 3A, and 3B, exemplary hasp pocket member 212 is a pre-fabricated piece; for example, a welded metal piece wherein a chamber member 216 is welded or otherwise permanently affixed to base member 318. As shown in FIG. 3A, a throughhole 320 may be provided that is dimensioned to permit filling the interior (not shown) of the chamber member. In pre-fabricated embodiments, such as hasp pocket member 212, the throughhole (throughhole 320) may be located in the base member (base portion 318). In pre-fabricated and retrofitted embodiments, the throughhole may be located in another location, such as in chamber member 216. In the case of a retrofitted embodiment, a chamber member may be affixed (e.g., via welding) to a base member (e.g., base member 318) that is already affixed to a structure, such as an enclosure, at the time of retrofitting.

In general, the hasp pocket member of the embodiments disclosed herein may be filled with generally any fill material suitable to enhance the resistance of the hasp pocket member to mechanical attacks, such as grinder attacks, cutting torch attacks, etc. For example, in some embodiments, chamber member 216 may be filled with concrete, stone, metal or alloyed metals, glass, sand, and/or polymeric materials, etc. In the case of pre-fabricated embodiments, the chamber member may be filled before installation or after installation. In the case of retrofitted embodiments, the chamber portion may be filled after installation.

As illustrated in FIGS. 2A, 2B, and 3B, chamber member 216 may be shaped or otherwise configured at near end 321*a* to provide a lock guard. For example, in the embodiment shown in the referenced figures, near end 321*a* of chamber member 216 is configured as a concave end or surface that is dimensioned so as to function as a cylindrical lock guard portion. As may be seen, the radius of curvature is dimensioned such that the curved end forms a surface that is proximate to the curved outer surface of a puck padlock. In other embodiments, near end 321*a* may be configured so as to provide a proximate surface to padlocks of other dimensions or shapes.

As illustrated in FIGS. 2A, 2B, and 3B, ribbed hasp plate 214 may comprise a hasp plate having a first end 323*a* and a second end 323*b* distal from the first end along a horizontal longitudinal axis. Ribbed hasp plate 214 may have a staple (e.g., staple 224) proximate first end 323*a* and at least one multiplanar lock guard, such as for example, guard 222. A multiplanar lock guard may generally comprise a hasp flange or rib that is generally (outwardly) normal to the plane of the hasp plate, that is located proximate padlock 122, that is oriented in at least two planes, and that has an angle between at least two of the at least two planes (a dihedral angle) that is between about 10 degrees and about 170 degrees; in some embodiments, between about 30 degrees and about 150 degrees; in some embodiments, between about 70 degrees and about 110 degrees. As illustrated in FIGS. 2A, 2B, and 3B, guard sections 222*a*, 222*b* of multiplanar lock guard 222 are oriented in two planes (a curved plane and a flat plane) that have a dihedral angle $\varphi$ (indicated in FIG. 2B) between them of between about 30 degrees and about 150 degrees.

The multiplanar lock guard of the embodiments herein functions to provide better protection against mechanical disruption than conventional guards (e.g., flange 136 of FIG. 1B). For example, in relation to lock guard 222, mechanical disruption by means of a grinder would need to disrupt both the curved guard portion 222*a* and linear guard portion 222*b* in order to breach the guard and gain entry to the padlock 122.

Figure 4:
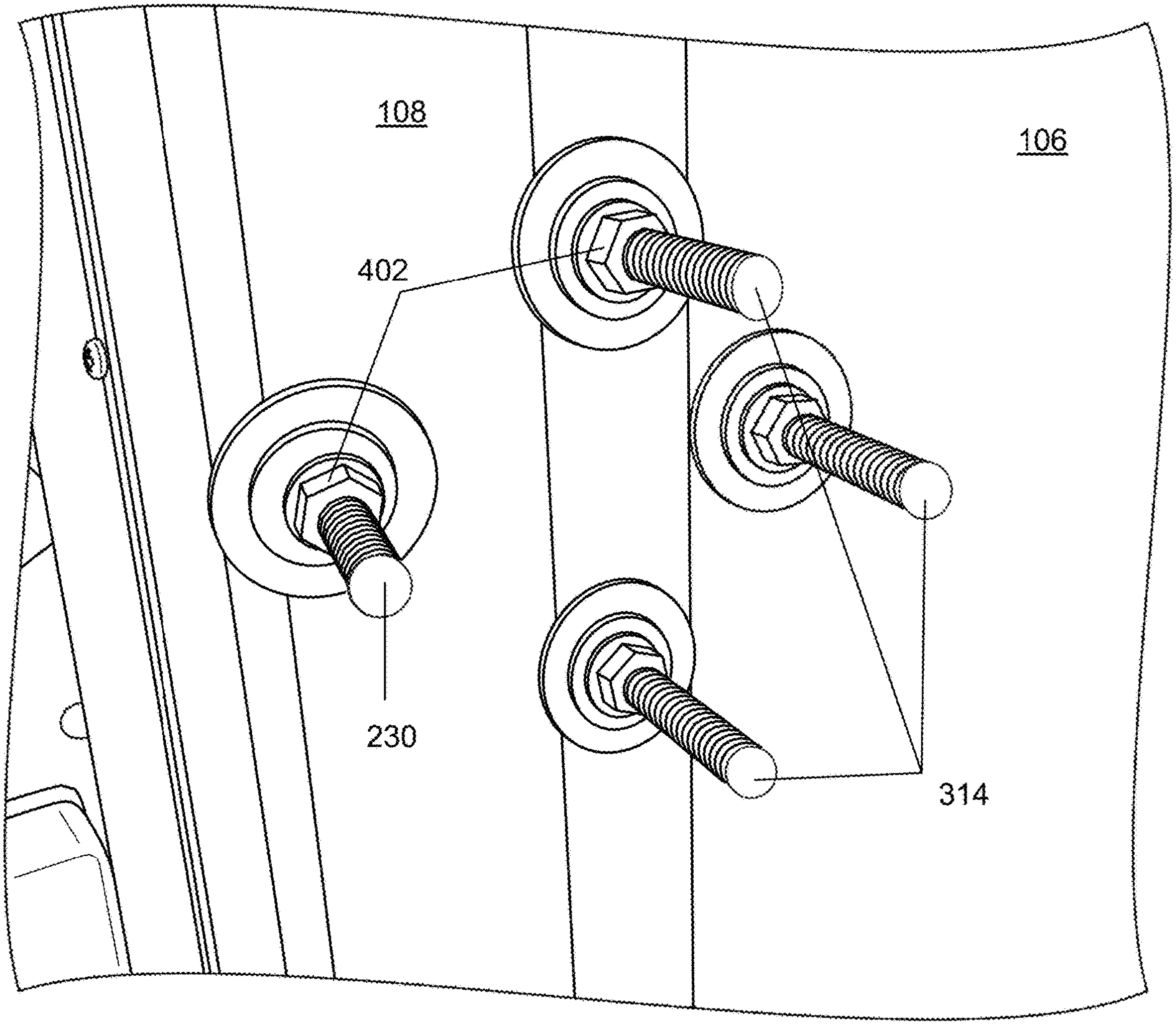
FIG. 4 is a perspective view of affixing bolts securing a hasp pocket member of the present disclosure to an enclosure wall and entryway frame, according to an exemplary embodiment.

In general, the hasp pocket member and ribbed hasp plate of the embodiments disclosed herein may be affixed to an enclosure in any manner sufficient to provide the function described herein. In some embodiments, hasp pocket member 212 and ribbed hasp plate 214 may be affixed to wall 106, frame 108, and/or door 104, respectively, by one or more bolts. In particular, referring to FIGS. 3A, 3B and 4, in some embodiments bolts 314 and 230 may affix hasp pocket member 212 to wall 106 and frame 108, with each bolt's threaded shaft extending through throughholes in wall 106 and frame 108 and secured by washers and nuts 402 threaded around each shaft near its distal end, as shown in FIG. 4. Similarly, bolts 316 may affix ridged hasp plate 214 to door 104.

Referring to bolt 230, which may be referenced herein as a frustrating bolt, in general the purpose of the frustrating bolt is to keep staple 220 affixed to the enclosure and/or frame even when a mechanical disruption has taken place on the body or other portions of hasp pocket member, such as a longitudinal slice or cut near the middle of the hasp chamber member in the nature of the hasp cut 140 in FIG. 1B. In general, the frustrating bolt 230 may be located proximate staple 220, such that this bolt cannot be accessed by a tool (e.g. grinder, saw, etc.) without removing the padlock (not shown) which provides cover for the frustrating bolt.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

No element, act, or instruction used in the present application should be construed as critical or essential unless explicitly described as such. Moreover, "example" and "exemplary" are used herein to mean serving as an example, instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed:

1. An apparatus comprising:

a hasp pocket member configured to be affixed to an enclosure wall proximate an entryway, wherein the hasp pocket member includes:

a base member having a first end and a second end that is distal from the first end along a horizontal longitudinal axis, wherein the base member comprises a hasp plate having a staple proximate the first end, and a chamber member having a near end proximate the first end and a far end proximate the second end, wherein a first axis extending from the first end to the near end is approximately parallel to a second axis extending from the second end to the far end, wherein the chamber member is permanently affixed to the base member, wherein the chamber member is configured at the near end to provide a lock guard, and wherein the chamber member is filled with at least one of concrete, stone, metal, metal alloy, glass, sand, or polymeric material.

2. The apparatus of claim 1, wherein the hasp pocket member is affixed to the enclosure wall by a plurality of bolts, and wherein one of the plurality of bolts is located proximate the staple.

3. The apparatus of claim 1, wherein the near end of the chamber member is configured to provide a cylindrical lock guard.

4. The apparatus of claim 2, wherein the near end of the chamber member is configured to provide a cylindrical lock guard.

5. A high security hasp comprising:

a ribbed hasp plate configured to be affixed to an entryway door, wherein the ribbed hasp plate includes a multiplanar lock guard and a hasp plate having a first end and a second end that is distal from the first end along a first axis, wherein the multiplanar lock guard comprises (i) a curved guard portion and (ii) a linear guard portion having an edge that extends from a first side, of the curved guard portion, that is distal from the hasp plate, to a point of the hasp plate proximate to the second end; and a hasp pocket member configured to be affixed to an enclosure wall proximate the entryway door.

6. The high security hasp of claim 5, wherein the multiplanar lock guard comprises a rib that projects outwardly normal to the plane of the hasp plate and that is oriented in at least two planes.

7. The high security hasp of claim 5, wherein the linear guard portion has a dihedral angle with the curved guard portion of between about 30 degrees and about 150 degrees.

8. The high security hasp of claim 5, wherein the hasp pocket member includes:

a base member having a first end and a second end that is distal from the first end along a horizontal longitudinal axis, wherein the base member comprises a hasp plate having a staple proximate the first end, and a chamber member having a near end proximate the first end and a far end proximate the second end, wherein the chamber member is permanently affixed to the base member, and wherein the chamber member is configured at the near end to provide a lock guard.

9. The high security hasp of claim 8, wherein the near end of the chamber member is configured to provide a cylindrical lock guard.

10. The high security hasp of claim 8, wherein the chamber member is filled with at least one of concrete, stone, metal, metal alloy, glass, sand, or polymeric material.

11. The high security hasp of claim 8, wherein the hasp pocket member is affixed to the enclosure wall by a plurality of bolts, and wherein one of the plurality of bolts is located proximate the staple.

12. A locking system comprising:

a ribbed hasp plate configured to be affixed to an entryway door, wherein the ribbed hasp plate includes a multiplanar lock guard proximate a padlock, wherein the multiplanar lock guard comprises (i) a curved guard portion extending circumferentially along at least a portion of a perimeter of the padlock so as to partially surround the padlock and (ii) a linear guard portion extending from the curved guard portion in a direction away from the padlock; and a hasp pocket member configured to receive the padlock and to be affixed to an enclosure wall proximate the entryway door.

13. The locking system of claim 12, wherein the multi-planar lock guard comprises a rib that projects outwardly normal to the plane of a hasp plate and that is oriented in at least two planes.

14. The locking system of claim 13, wherein the linear guard portion has a dihedral angle with the curved guard portion of between about 30 degrees and about 150 degrees.

15. The locking system of claim 12, wherein the hasp pocket member includes:

a base member having a first end and a second end that is distal from the first end along a horizontal longitudinal axis, wherein the base member comprises a hasp plate having a staple proximate the first end, and a chamber member having a near end proximate the first end and a far end proximate the second end, wherein the chamber member is permanently affixed to the base member, and wherein the chamber member is configured at the near end to provide a lock guard.

16. The locking system of claim 15, wherein the padlock is a cylindrical padlock, and the near end of the chamber member is configured to provide a cylindrical lock guard.

17. The locking system of claim 15, wherein the chamber member is filled with at least one of concrete, stone, metal, metal alloy, glass, sand, or polymeric material.

18. The locking system of claim 15, wherein the multi-planar lock guard comprises a rib that projects outwardly normal to the plane of the hasp plate and that is oriented in at least two planes.

19. The locking system of claim 18, wherein the linear guard portion has a dihedral angle with the curved guard portion of between about 30 degrees and about 150 degrees.

20. The locking system of claim 15, wherein the hasp pocket member is affixed to the enclosure wall by a plurality of bolts, and wherein one of the plurality of bolts is located proximate the staple.

* * * * *